United States Patent [19]

Bentley et al.

[11] 4,206,099

[45] Jun. 3, 1980

[54] AUTOXIDIZABLE COATING COMPOSITIONS

[75] Inventors: John Bentley; Morice W. Thompson, both of Maidenhead, England

[73] Assignee: Imperial Chemical Industries Limited, London, England

[21] Appl. No.: 896,362

[22] Filed: Apr. 13, 1978

[30] Foreign Application Priority Data

Apr. 25, 1977 [GB] United Kingdom ............... 17125/77

[51] Int. Cl.$^2$ .......................... C09D 3/48; C09D 3/66
[52] U.S. Cl. .............. 260/22 CB; 260/18 R; 260/22 M; 260/23 P; 260/33.6 UA
[58] Field of Search ............. 260/22 CB, 22 M, 23 P, 260/33.6 UA, 861, 875, 876 R, 877, 18 R

[56] References Cited

U.S. PATENT DOCUMENTS

| | | | |
|---|---|---|---|
| 3,264,234 | 8/1966 | Osmond | 260/22 CB |
| 3,382,297 | 5/1968 | Thompson | 260/33.2 R |
| 3,433,753 | 3/1969 | Farkas et al. | 260/22 CB |
| 3,514,500 | 5/1970 | Osmond et al. | 260/874 |
| 3,607,821 | 9/1971 | Clarke et al. | 260/33.6 R |
| 3,652,472 | 3/1972 | Clarke et al. | 260/22 CB |
| 3,661,835 | 5/1972 | Baker et al. | 260/29.1 R |
| 3,686,114 | 8/1972 | Thompson et al. | 260/33.6 UA |
| 3,717,605 | 2/1973 | Osmond et al. | 260/33.6 R |
| 3,812,075 | 5/1974 | Burdett et al. | 260/33.6 R |
| 3,857,810 | 12/1974 | Baker et al. | 260/33.6 R |
| 3,891,572 | 6/1975 | Moody et al. | 424/33 |
| 3,925,295 | 12/1975 | Osborn et al. | 260/33.6 R |
| 3,935,155 | 1/1976 | Osmond et al. | 260/33.6 R |
| 3,948,846 | 4/1976 | Waters | 260/33.6 UA |
| 3,981,839 | 9/1976 | Asher et al. | 260/33.6 R |
| 3,985,700 | 10/1976 | Nicks et al. | 260/33.6 R |
| 4,025,471 | 5/1977 | Takahashi | 260/22 CB |
| 4,059,557 | 11/1977 | Bentley et al. | 260/33.6 UA |
| 4,102,846 | 7/1978 | Bentley et al. | 260/31.2 N |

FOREIGN PATENT DOCUMENTS

| | | | |
|---|---|---|---|
| 941304 | 11/1963 | United Kingdom . | |
| 992637 | 5/1965 | United Kingdom . | |
| 1052241 | 12/1966 | United Kingdom | 260/22 CB |
| 1156012 | 6/1969 | United Kingdom | 260/22 CB |
| 1242054 | 8/1971 | United Kingdom . | |
| 1319781 | 6/1973 | United Kingdom | 260/22 CB |

*Primary Examiner*—Ronald W. Griffin
*Attorney, Agent, or Firm*—Cushman, Darby & Cushman

[57] ABSTRACT

Coating compositions are described in which the film-forming material consists of (a) 30–85% by volume of disperse particles of size 0.01–20 microns, of which not less than 50% by volume are cross-linked polymer microparticles, and (b) 70–15% by volume of a liquid continuous phase of viscosity 0.1–20 poise which is curable to a film-forming polymer by means of an autoxidative (i.e. air-drying) mechanism, the particles (a) being stably dispersed in the liquid (b) in a deflocculated state by means of an amphipathic steric stabilizing agent. Typically, the polymer microparticles may be composed of a cross-linked polyester and the liquid continuous phase of a drying-oil fatty acid ester of a polyol, optionally in conjunction with a coreactive liquid such as an acrylic or methacrylic ester of a higher alcohol or a polyol.

11 Claims, No Drawings

AUTOXIDIZABLE COATING COMPOSITIONS

This invention relates to autoxidisable coating compositions having a high content of film-forming material, more particularly to such compositions in which a substantial proportion of the total film-forming material consists of polymer microparticles and the remaining proportion of that material consists predominantly of liquid compounds which are susceptible to an autoxidative curing (i.e. air-drying) process.

In the coatings art, there has in recent years been a marked interest in increasing as much as possible the proportion present in coating compositions of actual film-forming material, and hence of reducing the proportion of inert liquid diluents which are required to evaporate during the process of forming a film and causing it to dry or cure. One factor which has promoted this interest is the realisation that such use of inert diluents is inherently wasteful, but perhaps the most significant factor is the need to reduce atmospheric pollution caused by their evaporation. The achievement of higher contents of film-forming material is, however, subject to difficulties, of which the most immediate is the penalty of high viscosity which is incurred when attempts are made to dissolve a high proportion of film-forming polymer in a small proportion of liquid diluent. This penalty may be avoided or minimised by using film-forming materials of lower molecular weight which are capable of undergoing further polymerisation after application to the substrate, but other difficulties then arise due to the fact that these materials are required to have a high functionality in order to achieve an acceptable rate of cure of the film. In autoxidative curing systems particularly, such high functionality means that the degree of curing can continue to increase over an extended period of time and eventually become excessive, leading to embrittlement and other inferior mechanical properties in the film.

Coating compositions have already been proposed in which part of the film-forming polymer is present as insoluble polymer microparticles; films or coatings prepared from such compositions are of a composite character, having a polymer matrix or continuous phase derived from polymer which was originally present in solution, and a disperse phase derived from the microparticles. These proposals have had as their principal objective the useful modification of the mechanical properties, e.g. of impact strength, of the matrix polymer by the presence of the microparticles.

We have now devised coating compositions of the autoxidative curing type which are capable of having very high film-forming solids contents and yet are not prone to the disadvantages referred to above.

According to the present invention there is provided a coating composition in which the film-forming material consists of:

(a) from 30% to 85% by volume of a disperse phase consisting of particles having a size or size distribution in the range 0.01 to 20 microns, not less than 50% by volume of those particles consisting of crosslinked polymer microparticles, and the disperse phase being in a state of stable dispersion as hereinafter defined in (b) from 70% to 15% by volume of a liquid continuous phase having a viscosity of from 0.1 to 20 poise at room temperature which is capable of curing to a film-forming polymer, the total volume of (a) and (b) being 100% and either the disperse phase or the continuous phase, or both, containing autoxidisable groupings which are capable of initiating the curing of the continuous phase.

When we refer to "autoxidisable groupings", we mean groupings which, through initial attack by atmospheric oxygen, can bring about the subsequent dimerisation and/or polymerisation of the substance containing that grouping. It may at the same time bring about the dimerisation and/or polymerisation of other substances present containing groupings which, although not autoxidisable in the sense just defined, are "coreactive" in the sense that they can take part in the polymerisation process initiated by the other species. This is the process commonly referred to as 'air-drying' and, as is well recognised, is dependent upon the presence in the constituent in question of certain types of unsaturated grouping; specific examples of such groupings are mentioned in the description which follows.

The polymer microparticles present in the disperse phase of the compositions of the invention are, as will be apparent from the foregoing definition, particles of cross-linked polymer which are of colloidal dimensions and are insoluble in the continuous phase liquid. The polymer of which the microparticles consist may be either of the addition type, in particular a polymer or copolymer of one or more $\alpha,\beta$-ethylenically unsaturated monomers, or of the condensation type, for example a polyester or a polyamide. Condensation polymer microparticles may be preferred because of their lower cost; in some circumstances, however, depending on the type of application intended, addition polymer microparticles may be more desirable because of their superior colour.

The microparticles may if desired be plasticised with an inert plasticiser which may be either soluble or insoluble in the continuous phase liquid The state of stable dispersion in the continuous phase liquid, in which the crosslinked polymer microparticles are present, is a substantially de-flocculated, sterically stabilised state achieved by means of an amphipathic dispersing agent, the molecule of which contains a polymeric component which is solvatable by the continuous phase liquid and another component which is relatively non-solvated thereby and is capable of associating with the surface of the microparticles, or preferably of reacting with the polymer contained in those particles. By 'solvatable' is here meant that, if the polymer component of the dispersing agent were unattached to the remainder of the agent molecule, it would be soluble in the continuous phase liquid wholly as individual molecules. The dispersing agent will itself also be soluble in the continuous phase liquid, but the resulting solution will usually contain both individual molecules and micellar aggregates of molecules, in equilibrium with each other. The type of dispersing agent preferred for use in the invention is a block or graft copolymer containing two types of polymeric component; one type consists, as stated above, of polymer chains which are solvatable by the continuous phase liquid and the other type consists of polymer chains which are of different polarity from the first type, are accordingly not solvatable by that liquid and are capable of becoming anchored to the polymer microparticles. A particularly useful form of such a dispersing agent is a graft copolymer comprising a polymer backbone, which is the non-solvatable or anchor component, and a plurality of solvatable polymer chains pendant from the backbone.

In one embodiment of the invention, the amphipathic dispersing agent contains in the molecule autoxidisable groupings as hereinbefore defined which are capable of initiating the curing of the liquid continuous phase of the composition. Usually such autoxidisable groupings will be present in the solvatable component of the dispersing agent molecule but they may if desired be present in some other part of the molecule. Through the agency of these groupings, the curing of the continuous phase is either brought about or (where similar groupings are present in the continuous phase itself) assisted, and at the same time the polymeric microparticles are caused, in a cured film prepared from the composition of the invention, to become bonded to the matrix constituted by the polymer formed on curing of the liquid continuous phase.

Where the amphipathic dispersing agent does not contain autoxidisable groupings as such, it is nevertheless preferred that the dispersing agent should contain groupings which are at least coreactive as hereinbefore defined, that is to say which are capable of taking part in (as distinct from initiating) the autoxidative curing process undergone by the liquid continuous phase. The location of such groupings in the dispersing agent molecule, and the role of such groupings in ensuring bonding of the microparticles to the matrix polymer, will be the same as that discussed above in the case of autoxidisable groupings.

The nature of both the autoxidisable groupings and the coreactive groupings, which may be present in the amphipathic dispersing agent, is discussed in detail below.

In addition, the component of the amphipathic dispersing agent which is capable of associating with the surface of the crosslinked polymer microparticles will preferably contain groupings which are capable of becoming chemically linked to the polymer of which the microparticles consist. For example, it may be arranged that the associating component of the dispersing agent contains a glycidyl group and that the polymer in question contains a carboxyl group, these groups then being caused to co-react. Another method of bringing about such a linkage is described below in connection with methods for producing the microparticles.

The purpose of the preferred features of the invention described in the immediately preceding paragraphs is to ensure that a strong bond is developed between the polymer microparticles and the matrix polymer formed on curing of the film-forming constituent of the continuous phase liquid. Since each microparticle is essentially enclosed by a sheath or barrier composed of the amphipathic dispersing agent, whereby the steric stability of the microparticles is achieved, it is highly desirable that this barrier should become firmly bonded both to the microparticles and to the matrix polymer in order to ensure optimum mechanical properties and durability of the ultimate fully cured film.

The stable dispersion of the crosslinked polymer microparticles in the continuous phase liquid may be prepared by dispersing pre-formed crosslinked polymer particles of suitable size in that liquid in the presence of the amphipathic dispersing agent. However, the dispersion is more desirably and conveniently obtained by generating the microparticles in situ through a process of dispersion polymerisation of suitable monomers in the presence of the same dispersing agent, using as diluent a volatile, inert organic liquid in which the microparticles produced are insoluble. The microparticles can if desired subsequently be separated from the resulting dispersion, e.g. by spray drying, and then incorporated with the continuous phase liquid (in which they will become stably dispersed) in order to produce the composition as hereinbefore defined. Alternatively, and preferably, the liquid film-forming material may be added to the dispersion when polymerisation of the monomers is complete and the volatile diluent then removed by distillation, leaving a stable dispersion of the microparticles in that material. However, as discussed below, the presence in the compositions of a minor proportion of an inert liquid diluent is in some cases acceptable and the dispersion of microparticles can under these circumstances be blended directly with the other constituent or constituents of the liquid continuous phase.

Suitable processes of dispersion polymerisation are well known and extensively described in the literature. Thus, so far as the free-radical initiated dispersion polymerisation of $\alpha,\beta$-ethylenically unsaturated monomers is concerned, the procedure is basically one of polymerising the monomers in an inert liquid in which the monomers are soluble but the resulting polymer is not soluble, in the presence dissolved in the liquid of the amphipathic dispersing agent or of a polymeric precursor which, by copolymerisation or grafting with a portion of the monomers, can give rise in situ to such a dispersing agent. Reference may be made, for example, to British Patent Specification Nos. 941,305; 1,052,241; 1,122,397; and 1,231,614 for a general description of the principles involved, as well as to "Dispersion Polymerisation in Organic Media", ed. K. E. J. Barrett (John Wiley & Sons, 1975).

Typical ethylenically unsaturated monomers include acrylic acid and methacrylic acid and their esters such as methyl methacrylate, butyl methacrylate, ethyl acrylate, butylacrylate, 2-ethyl hexyl acrylate, vinyl esters such as vinyl acetate, the vinyl ester of "Versatic acid" (Registered Trade Mark), vinyl chloride, vinylidene chloride, vinyl aromatics such as styrene, vinyl toluene and tertbutyl styrene, acrylonitrile and methacrylonitrile. The production specifically of dispersions of crosslinked addition polymer particles can be achieved by selecting monomers which contain complementary reactive groups in addition to the unsaturated, polymerisable groupings, for example, glycidyl methacrylate or methacrylic acid; by following the procedures particularly described in British Patent Sepcifications Nos. 1,095,288 and 1,156,012, for example, particles are obtained in which there are present such complementary groups which, although not at that stage co-reacted, can be caused to co-react and so form cross-links by subsequently heating the dispersion to a suitably elevated temperature. Cross-linked addition polymers may also be prepared in dispersion by including in the monomers undergoing dispersion polymerisation a minor proportion of a monomer which is difunctional with respect to the polymerisation reaction, such as ethyleneglycol dimethacrylate or divinylbenzene.

The production of dispersions of condensation polymers is described, for example, in British Patent Specifications Nos. 1,373,531; 1,403,794 and 1,419,199, and methods of obtaining crosslinked polymer particles are included in these descriptions. The general principles involved here are the same as those referred to above in connection with addition polymer dispersions, but there is a difference of detail arising from the commonly more highly polar nature of the monomers or starting materials from which condensation polymers are derived. This is, namely, that the monomers in question are usually insoluble in the inert liquid in which the polymerisation is to be carried out. Accordingly the first step in the dispersion polymerisation of the monomers is to bring them into a state of colloidal dispersion in the inert liquid, either as liquid or as solid particles. In the second step, polymerisation of the monomers takes place mainly within those same particles. An amphipathic dispersing agent is required in each stage, firstly in order to stabilise the particles of monomer and secondly in order to stabilise the particles of polymer formed, but in suitable cases a single dispersing agent can be found which will perform both these functions. In place of using a pre-formed amphapathic dispersing agent in this process, there may be employed instead a suitable polymeric precursor which, by copolymerisation or grafting with a portion of the monomers being polymerised, can give rise to such a dispersing agent in situ. Reference may be made in this connection to U.S. patent application of Bentley Ser. No. 795,307 filed May 9, 1977.

Suitable monomeric starting materials for preparing condensation polymer microparticles are those which are well known for use in making such polymers by melt or solution polymerisation techniques. For example, suitable materials in the case of polyester microparticles are polyhydric alcohols such as ethylene glycol, propylene glycol, butylene glycol, 1:6-hexylene glycol, neopentyl glycol, diethylene glycol, triethylene glycol, tetraethylene glycol, glycerol, trimethylolpropane, trimethylolethane, pentaerythritol, dipentaerythritol, tripentaerythritol, hexane triol, oligomers of styrene and allyl alcohol (for example, that sold by Monsanto Chemical Co. under the designation RJ 100) and the condensation products of trimethylolpropane with ethylene oxide or propylene oxide (such as the products known commercially as "Niax" triols), in conjunction with polycarboxylic acids such as succinic acid, or anhydride, adipic acid, azelaic acid, sebacic acid, maleic acid or anhydride, fumaric acid, muconic acid, itaconic acid, phthalic acid or anhyride, isophthalic acid, terephthalic acid, trimellitic anhydride, pyromellitic acid or anhydride, truxinic acid or truxillic acid. In the case of polyamide microparticles, suitable monomeric starting materials are aminocarboxylic acids such as 6-aminocaproic acid or 11-amino-undecanoic acid, or the corresponding lactams, and/or polyamines such as ethylene diamine, propylene diamine, hexamethylene diamine, diethylene triamine, triethylene tetramine or tris-(aminomethyl) methane in conjunction with the polycarboxylic acids mentioned above.

It will of course be understood that, in the case of both polyester and polyamide microparticles, the mixture to be polymerised must incorporate some proportion of a starting monomer which has a functionality greater than two, in order to that the resulting microparticles should be crosslinked.

A feature of certain of the dispersion polymerisation processes referred to above, in particular those described in British Patent Specifications Nos. 1,231,614; 1,373,531; 1,403,794 and 1,419,199 is that the amphipathic dispersing agent used contains groupings which are capable of taking part in the polymerisation of the monomers from which the polymer of the microparticles is derived. In the case where that polymer is of the addition type, the dispersing agent may, for example, carry in the molecule a double bond copolymerisable with the unsaturated monomers; in the case of a condensation polymer, the dispersing agent may, for example, contain epoxide groups which can co-react with the hydroxyl, carboxyl or amino groups present in the monomers employed. Use of this feature makes it possible to ensure the firm anchoring or bonding of the dispersing agent to the surface of the microparticles, which was referred to earlier.

Some examples of suitable amphipathic dispersing agents in accordance with the foregoing description are the following:

(i) a graft copolymer obtained by reacting poly(ricinoleic acid) with an 85:15 copolymer of methyl methacrylate and glycidyl methacrylate of molecular weight 10,000–20,000; this graft copolymer thus has an acrylic backbone which is the anchor component and, pendant therefrom, a plurality of solvatable side-chains which also possess autoxidisable functionality.

(ii) a graft copolymer obtained by reacting (a) a low molecular weight, carboxyl group-terminated condensate of linseed oil fatty acids and 12-hydroxystearic acid with (b) a 90:10 copolymer of ethyl acrylate and glycidyl methacrylate; the structural functionality of this copolymer is similar to that of (i).

(iii) the reaction product of a carboxyl group-terminated polybutadiene of molecular weight about 4000 and an 80:20 copolymer of methyl methacrylate and glycidyl methacrylate.

(iv) a graft copolymer similar to (ii) but made using a deficiency of the fatty acid condensate so as to leave some unreacted glycidyl groups in the copolymer backbone which are capable of reacting with the polymer in the microparticle by a condensation reaction.

(v) a graft copolymer as in (iv) where the excess of glycidyl groups are subsequently reacted with acrylic acid or methacrylic acid so as to introduce groups pendant from the backbone which are capable of copolymerising with vinyl monomers from which the microparticles are derived.

(vi) the graft copolymer produced in situ during the production of condensation polymer microparticles, from the reaction of the glycidyl ester of poly(ricinoleic acid) as precursor with the polymerising reactants.

(vii) the product of (a) reacting 4-hydroxybutylvinyldioxolane with poly-(12-hydroxystearic acid) and (b) subsequently reacting the hydroxy polymer obtained with a copolymer of methyl methacrylate and methacrylic anhydride; the copolymer product has an acrylic anchor backbone and pendant solvatable chains which are terminated by vinyl dioxolane groups that are capable of undergoing both autoxidative and normal vinyl polymerisation reactions.

A cured film prepared from a coating composition according to the invention will contain a high proportion of the crosslinked polymer microparticles and accordingly the properties of those particles themselves will contribute significantly to the mechanical properties of the film. The microparticles may be rubbery or glassy, that is to say their glass transition temperature (Tg) may be below or above ambient temperature respectively, and this will be reflected in the properties of the final film. Where the polymer is rubbery, this inclusion of rubbery particles may contribute to, e.g. the impact resistance of the cured film.

It has previously been stated that the microparticles should have a size or size distribution in the range 0.01–20 microns. In order to obtain high solids compositions, it is useful if the particles are not of uniform particle size distribution; this ensures fluid compositions at higher disperse phase packing fractions. The distribution may be bimodal or polymodal.

Although the disperse phase of the compositions of the invention may consist solely of the crosslinked polymer microparticles, in which case those particles themselves will constitute from 30% to 85% by volume of the total composition, as previously defined, there may (and in most cases will) also be present in the disperse phase particles of pigments, fillers or extenders such as are commonly used in coating compositions. Such particles will preferably be of a size or size distribution which is conventional in the coatings art, for example from 0.1 to 5 microns; they may be either similar or dissimilar in size to the crosslinked polymer microparticles, but, where they are dissimilar in size to the latter, higher concentrations of disperse phase and hence higher solids contents may be attained through the use of bimodal or polymodal size distributions. Like the crosslinked polymer microparticles, the pigment, filler or extender particles will be stably dispersed in a deflocculated state in the liquid continuous phase. This state of dispersion may be achieved with the aid of known types of pigment dispersant, but in many cases the liquid film-forming material in the continuous phase, or a chemical variant thereof, may itself be an effective dispersant. Alternatively, the pigment may be dispersed in the dispersion of microparticles in inert liquid, where those particles have been obtained by dispersion polymerisation of monomer in that liquid in the manner previously described. In this case, residual amounts of the amphipathic dispersing agent whereby the microparticles are stabilised will serve also to stabilise the pigment particles, and may additionally render them capable of participating in the autoxidative curing reaction. In both the above techniques, the operation of dispersing the pigment may be carried out in the ways which are conventional in the paint industry; i.e. by the use of ballmills, bead mills, attritors or colloid mills.

Yet another procedure for introducing pigments is that of carrying out the dispersion polymerisation process, whereby the microparticles are obtained, actually in the presence of the pigment. In this way, each microparticle can be caused to incorporate one or more sub-particles of pigment. Such techniques of polymer encapsulation of pigments are described, so far as addition polymers are concerned in British Patent Specification No. 1,156,653 and, so far as condensation polymers are concerned, in British Patent Specification No. 1,453,713 or in the specification filed in pursuance of U.S. Pat. No. 4,102,846.

It also lies within the scope of the present invention to include in the disperse phase polymer microparticles which are not crosslinked, in addition to the microparticles which are crosslinked. These non-crosslinked microparticles may be similar in size, composition and the method of their preparation to the crosslinked particles described above, except that they will be derived from monomers which are strictly of a functionality not greater than two.

These other particles, whether of pigment or like materials, or of non-crosslinked polymer, or both, may be present in the disperse phase in any amount up to a maximum which is equal in volume to the crosslinked polymer microparticles present, but the total amount of all these particles will always lie in the range 30% to 85% of the total volume of the composition.

The other essential component of the film-forming material in the compositions of the invention is, as already indicated, the liquid continuous phase which has a viscosity lying within a specified range, namely from 0.1 to 20 poise at room temperature, and is capable of curing to a polymeric film by a process initiated by autoxidisable groupings as hereinbefore defined. It follows from this definition that the liquid continuous phase must at least possess groupings which are coreactive in the sense previously used. Preferably, however, the liquid continuous phase itself possesses autoxidisable groupings; it may, if desired, possess both autoxidisable and coreactive groups.

Autoxidisable groupings should constitute at least 1%, preferably at least 30%, of the total number of autoxidisable and coreactive groupings present in the composition. Furthermore, at least 10%, preferably at least 50%, of the total number of autoxidisable groups present should be contributed by materials containing at least two such groups in the molecule.

In general, the continuous phase liquid may be either a single liquid substance or a homogeneous liquid mixture of two or more substances. In the case of such a mixture, one or more of the constituents may be solid at normal temperatures provided that such a solid constituent is soluble in another constituent which is liquid and that the mixture as a whole is liquid at normal temperatures. Autoxidisable groupings may be carried by one or more constituents of the continuous phase liquid and coreactive groups, if present, may be carried by one or more other constituents thereof; alternatively, one or more constituents may carry both autoxidisable and coreactive groups in the same molecule.

Suitable autoxidisable groupings include residues of autoxidisable fatty acids, such as those derived from linseed oil, soya bean oil, tall oil, dehydrated castor oil, fish oils or tung oil. They also include unsaturated systems such as those derived from pentadiene ($-CH=CH-CH_2-CH=CH-$), heptatriene ($-CH=CH-CH_2-CH=CH.CH_2CH=CH-$) and related conjugated systems; these are usually provided by natural unsaturated $C_{18}$ carboxylic acids. Other suitable groupings are unsaturated ether groupings such as are found in allyl ethers, cyclopentenylethers and vinyl dioxolanes, and residual unsaturation present in polymers or copolymers of butadiene. The foregoing are all materials which are capable of forming either hydroperoxides or peroxides; the latter decompose to give active radicals which can dimerise or initiate addition polymerisation, and therefore create linkages between the participating constituents at the temperature of curing of the film.

Suitable coreactive groupings are ethylenically unsaturated groupings such as $\alpha,\beta$-unsaturated groupings, allylic unsaturated groups and pentadienyl and heptatrienyl systems, all of which are capable of participating in a polymerisation initiated by radicals generated by an autoxidative mechanism from a constituent of the continuous phase liquid bearing an autoxidisable group.

Characteristically, substances carrying the autoxidisable groups, or the coreactive groups, or both, are liquids having viscosities in the range 0.1 to 500 poise at room temperature, although liquids of higher viscosity than this, or even solids, can be employed in certain circumstances, as mentioned above. They may be monomeric in character, or they may be oligomeric, or they may be polymers of low to medium molecular weight, e.g. in the range 250 to 5000. They are required to be of low volatility, which means that they should have boiling points in excess of 150° C., preferably in excess of 200°, at atmospheric pressure. Clearly, in order that the requirement may be satisfied that the liquid continuous phase as a whole has a viscosity of from 0.1 to 20 poise at room temperature, it may be necessary to blend a liquid substance of relatively high viscosity, or a solid substance, with another liquid substance of relatively low viscosity, e.g. one having a viscosity of less than 2 poise, preferably in the range 0.02 to 0.5 poise, at room temperature. In these circumstances, the constituent substances are required to have good mutual solubility or miscibility characteristics.

Examples of suitable liquids containing autoxidisable groupings include drying oils and oil-modified alkyd resins, a wide variety of which are well known for use in surface coating systems. A specific alkyd resin which may be mentioned is the phthalate oligomeric ester of linseed oil fatty acid monoglyceride. Other suitable liquids include esters of polyhydric alcohols, such as pentaerythritol, dipentaerythritol, tripentaerythritol, inositol and sorbitol, with any of the autoxidisable fatty acids mentioned above, e.g. tetra-esters of pentaerythritol with linseed oil fatty acid, tetra-or-hexa-esters of dipentaerythritol with the same acid, and tetra-, hexa or octa-esters of tripentaerythritol with the same acid. Also suitable are the tri-glycerides of the afore-mentioned autoxidisable fatty acids. Yet other suitable liquids containing autoxidisable groupings included are polyallyl ethers of polyhydric alcohols such as glycerol, diglycerol, triglycerol, tetraglycerol and polyethylene glycol as well as the oligomeric addition products obtained by reaction of allyl glycidyl ether with aliphatic alcohols, glycidol, glycols and polyols, e.g. the reaction products of decanol with four moles of allyl glycidyl ether.

Examples of liquids containing autoxidisable vinyldioxolane groups include the reaction products of 4-hydroxybutyl vinyl dioxolane with polycarboxylic acids or their precursors, such as pyromellitic anhydride, low molecular weight styrene/maleic anhydride copolymers and methyl methacrylate - ethyl acrylate - (meth)acrylic acid copolymers.

Examples of suitable liquids containing coreactive groupings include lauryl methacrylate, vinyl stearate, hydroxypropyl methacrylate, allyl pentadienoate, allyl methacrylate, trimethylolpropane triacrylate, trimethylolpropane trimethacrylate, ethylene glycol diacrylate, ethylene glycol dimethacrylate, 1:6-hexylene diacrylate, 1:6-hexylene dimethacrylate, and the diacrylates or dimethacrylates of tetra- and poly-ethylene glycols.

Yet other suitable liquids containing coreactive groupings are the following:- esters of allyl alcohol, cyclopentenyl ether alcohols and 4-hydroxybutyl vinyl dioxolane with mono-, di- or tri-carboxylic acids, for example, diallyl muconate, allyl sorbate, allyl hydrogen maleate, diallyl maleate, allyl hydrogen itaconate, diallyl itaconate, allyl crotonate and diallyl phthalate, the trimellitate of hydroxybutyl vinyl dioxolane, 1:3:4-trivinyldioxolane and mixed unsaturated fatty acid/acrylic acid esters of polyols such as glycerol; dioxanes and polydioxolanes which are the condensation products of acrolein or related unsaturated aldehydes with polyols such as pentaerythritol or sorbitol containing 1:2- or 1:3-diol groupings.

Examples of suitable liquids containing both autoxidisable and co-reactive groupings include the dimethacrylate of linseed oil fatty acid monoglyceride, linoleyl methacrylate and vinyl linoleate.

In addition to the film-forming components already mentioned, that is to say the disperse phase (a) and the liquid continuous phase (b), the compositions of the invention may contain up to 30% by volume, based on the total composition, of an inert liquid diluent which is a solvent for the liquid continuous phase and which volatilises under the conditions of application of the coating composition to a substrate. Expressed in another way, the film-forming content of the compositions may range from 70% to a maximum of 100% by volume.

Suitable inert diluents are liquids of low viscosity, preferably not more than 0.05 poise, which are capable of assisting (or at least do not positively hinder) the achievement of a state of stable dispersion of the disperse phase in the continuous phase. The inert diluent must be of sufficiently high volatility to be readily removed by evaporation from a coating formed from a composition of the invention, either at room temperature or at an elevated temperature as the process of curing the liquid continuous phase may require.

Examples of particularly suitable inert solvents include aromatic or aliphatic hydrocarbons, but other inert liquids of suitable volatility, lack of toxicity and absence of strong odour may be used, such as selected halogenated hydrocarbons, lower alcohols and water.

In the interests of achieving as high a film-forming solids content as possible in the compositions, it is preferred where possible to omit an inert solvent altogether, but its inclusion may be difficult to avoid entirely by reason of the crosslinked polymer microparticles themselves being most conveniently accessible in the form of a dispersion in an inert liquid, as mentioned above.

The compositions may also contain metallic or non-metallic drier systems whereby the autoxidative curing process is assisted. These may be, for example, conventional driers of the metallic soap type such as cobalt, calcium, zirconium or lead salts of naphthenic acid or octoic acid. These may conveniently be dissolved in the liquid continuous phase after all other constituents of the composition have been incorporated. The driers may be used in amounts which are conventional in air-drying coating compositions, for example amounts equivalent to a cobalt content of 0.1%, a lead content of up to 2% or a calcium content of up to 1%, based on the total weight of autoxidisable groups present.

Preferably the film-forming material in the coating compositions of the invention consists of from 40% to 80% by volume of disperse phase and from 60% to 20% by volume of liquid continuous phase as hereinbefore defined. It will be understood, therefore, that when these preferred ranges apply the total amount present of crosslinked polymer microparticles, any pigment, filler extender particles (including polymer-encapsulated pigment particles) and any non-crosslinked polymer microparticles will lie within the above range 40% to 80%.

Coating compositions according to the invention may be applied to substrate by any of the conventional methods, e.g. by brushing, rolling, spreading, spraying, including airless and electrostatic spraying, tumbling, curtain coating and roller coating. They undergo air-drying in a similar fashion to conventional air-drying paints, being touch-dry in from 30 minutes to 8 hours and through-dry in from 2 hours to 48 hours. However, unlike conventional air-drying paints, they typically have very high film-forming solids contents (80–100% by weight including pigment where present, as compared with 70% solids or lower in most known compositions), and in consequence possess distinct advantages in much reduced (or complete absence of) release of volatile materials on drying. In addition, they are superior to high-solids coating compositions which have previously been proposed in that a high proportion of the total solids present consists of pre-polymerised, highly functional material (viz. the crosslinked polymer microparticles), the extent of polymer-forming reactions which are required to take place after application to the substrate being therefore much less than in the composition where the film-forming material consists predominantly of monomeric or oligomeric substances. Their superiority in this respect is manifest in the possibility of building up coatings of a greater thickness in a single application with good scratch filling and without the penalty of surface shrinkage than is possible with known high-solids coating compositions. The presence of the preformed crosslinked polymer microparticles also imparts a greater constancy and consistency of durability and mechanical properties than is otherwise achieved. A still further advantage of the high microparticle content is the corresponding reduction in the proportion present of residues of natural drying oil fatty acids which tend to give rise to problems of smell, yellowing and premature embrittlement through overoxidation; moreover, a corresponding reduction can be made in the amount of metal soaps or driers, in particular of lead soaps, required to bring about oxidation and curing of the compositions.

For many methods of application, including brushing, it is an advantage if the rheology of the coating composition can be appropriately adjusted. For instance, a measure of thixotropic behaviour may help to prevent sagging of films on application or settling of the composition in the can. It is often found that compositions such as those of the present invention which contain high concentrations of disperse particles, whether of polymer or of pigment, tend rather to have dilatant characteristics. In the compositions illustrated in the Examples which follow, dilatancy is avoided by achieving a distribution of microparticle sizes; under these circumstances, high particle loadings are possible without the penalty of dilatant behaviour. Some degree of thixotropy can be introduced by careful control of the ingredients of the composition, in particular by using as one constituent of the continuous phase hexanediol dimethacrylate. This result may possibly be due to reversible swelling of the polymer microparticles by this coreactive liquid. Thixotropic structure may also be imparted by the use of certain drier systems, such as the zirconium-containing drier blend employed in Paint R in Example 2(C) below.

The invention is illustrated but not limited by the following Examples, in which parts and percentages are by weight unless otherwise stated.

EXAMPLE 1

A. Preparation of Polymer Microparticles (a) Preparation of Amphipathic Copolymer Dispersant (i) A mixture of technical ricinoleic acid (2770 parts), toluene (455 parts) and methanesulphonic acid (5 parts) was heated under reflux at 180°–190° C., water of condensation being removed (190 parts) until the reaction mixture was found to have an acid value of 32.4 mg KOH/g (reaction time was about 6 hours). The solution of poly(ricinoleic acid) thus obtained had a solids content of 84.3%. $\overline{M}_n$ determined by end-group analysis was 1731 and by gel permeation chromatography 2400; $\overline{M}_w$ was 5150, hence $\overline{M}_w/\overline{M}_n = 2.14$.

(ii) A mixture of methyl ethyl ketone (1600 parts) and toluene (1600 parts) was heated to reflux temperature and to it was fed, over a period of 2 hours with continuous reflux, a mixture of methyl methacrylate (1920 parts), glycidyl methacrylate (195 parts), azobis-(isobutyronitrile) (29 parts) and primary-octyl mercaptan (29 parts). The reaction mixture was held at reflux temperature for a further 4 hours. 2-Ethoxyethyl acetate (1778 parts) was then added and the mixture distilled until a total of 3200 parts of distillate was removed. The product was a 55% solids solution of copolymer having $\overline{M}_w/\overline{M}_n = 3.83$).

(iii) The copolymer solution obtained in (ii) (2685 parts) along with 1655 parts of 2-ethoxyethyl acetate was heated to reflux temperature and a mixture of the solution of poly(ricinoleic acid) obtained in (i) (750 parts) and dimethyllaurylamine (2.5 parts) was added. Heating under reflux was continued for 14 hours; a further mixture of the poly(ricinoleic acid) solution (750 parts) and dimethyllaurylamine (2.5 parts) was then added and refluxing continued for 36 hours, a small further amount of dimethyllaurylamine being added after 12 hours. The reaction mixture became progressively clearer over the total heating period and continuous monitoring of its acid value showed that the latter fell to a final value of less than 1 mg KOH/g. Hydrocarbon of boiling range 180°–210° C. ("Isopar L") (3500 parts) was added, and the mixture distilled until about 2500 parts of distillate had been removed. The product was a 40% solids solution of a graft copolymer dispersant having an acrylic polymer backbone and pendant side-chains of poly(ricinoleic acid) residues. It had $\overline{M}_n = 7000$ and $\overline{M}_w = 23,400$ ($\overline{M}_w/\overline{M}_n = 3.37$) as determined by gel permeation chromatography with polystyrene calibration.

(b) Preparation of Dispersion

A 4-liter reaction vessel was fitted with a turbine stirrer, inert gas inlet, a 12″ steam-heated fractionating column and a Dean and Stark separator. To this vessel was charged hydrocarbon boiling range 180°–210° C. ("Isopar L") (408 g), the 40% dispersant solution obtained in (a) (327 g), phthalic anhydride (740 g) and titanium ethylene glycol complex (1 g). This charge was heated to reflux temperature with rapid stirring, causing the phthalic anhydride to melt and become emulsified in the hydrocarbon. There was then added a mixture of trimethylolpropane (100.5 g), tetraethylene glycol (125 g) and diethylene glycol (92.75 g), followed by a similar mixture in the same amounts added at an even rate over a period of 2 hours. At the beginning of this addition, the reaction mixture had the appearance of a very fine milk-like dispersion, with blue light scatter; at the end, the mixture was white and opaque but still a stable dispersion. Heating at reflux temperature was continued for 24 hours, with the removal of water and gradual fall of acid value to a final value of about 41 mg KOH/g. Diluent was then removed by distillation to give a 77.5% solids dispersion of particles of a crosslinked tetraethylene glycol/diethylene glycol/trimethylolpropane phthalate polyester in the molar proportions 0.25/0.35/0.3/1. The viscosity of the dispersion was about 10 poise and the polyester microparticles were found to be of size 0.5–4 microns (optical microscope) and to have a glass-rubber transition temperature of about 15° C.

B. Preparation of Pigment Millbase

To a 1-gallon ball mill were charged titanium dioxide (760 g), the polyester microparticle dispersion described in A.(b) above (930 g) and the linseed oil fatty acid hexa-ester of tripentaerythritol (140 g), together with the requisite quantity of ⅜" steatite balls. The contents of the mill were ground for 80 hours, and the grinding media then separated. The product was an 88.5% solids dispersion, the solids present consisting of 47% titanium dioxide, 44.5% of the microparticulate polymer and 8.5% of the hexa-ester.

C. Preparation of Paint Composition

The following ingredients were mixed with stirring:

| | |
|---|---|
| Polymer Millbase described in B above | 1260 parts |
| Linseed oil fatty acid octa-ester of tripentaerythritol (viscosity 2.2 poise) | 194 parts |
| 1:6-Hexandediol dimethacrylate (viscosity 0.37 poise) | 65 parts |
| Drier mixture consisting of | |
| Cobalt octoate solution (10% Co as metal) | 3.4% |
| Lead octoate solution (36% Pb as metal) | 28.4% |
| Calcium octoate solution (5% Ca as metal) | 68.2% |

The blend so obtained had a film-forming content (including pigment) of 89% by weight (79% by volume) and a pigment volume of 13%; it had a viscosity under high shear of 4 poise. The composition of the blends as applied was as follows:

| | Constituent | % by weight | % by volume |
|---|---|---|---|
| Disperse Phase | Polymer microparticles | 31 | 39 |
| | Pigment | 34 | 12 |
| Continuous Phase | Autoxidisable liquid | 18 | 22 |
| | Co-reactive liquid | 4 | 5 |
| | Driers | 2 | 2 |
| Inert Diluent | | 11 | 20 |

The viscosity of the continuous phase, excluding driers, was 2.0 poise; that of the continuous phase plus driers and diluent, 0.3 poise.

The composition was brushed on to a metal panel at room temperature (20° C.). The film obtained was sag-resistant and had good build. After drying for three hours, the film was glossy, hard and durable.

EXAMPLE 2

A. Preparation of Polymer Microparticles

These consisted of a 0.3/0.3/0.3/1 1:4-butane diol/1:6-hexane diol/trimethylolpropane phthalate polyester; they were prepared by the same general procedure as is described in Example 1, using the same amphipathic copolymer dispersant as is used in that Example.

An apparatus as described in Example 1A(b) was charged with the following:

| | |
|---|---|
| Aliphatic hydrocarbon, boiling range 180°–210° ("Isopar L") | 688 parts |
| Phthalic anhydride Flake | 999 parts |
| Titanium-ethylene glycol complex catalyst | 1.1 parts |
| Graft copolymer dispersant solution (as described in Example 1A(a)) | 399 parts |

This charge was raised to reflux temperature (initially 180° C.) with rapid stirring and half of the following feed mix was then added over 15 mins. (the feed was warmed before use in order to dissolve the trimethylol propane):

| | |
|---|---|
| 1:4-Butane diol | 182 parts |
| 1:6-Hexane diol | 239 parts |
| Trimethylol propane | 272 parts |

The remaining feed mix was then added over a further 2 hours, and the batch refluxed for an additional 6 hours. During this period 120 g of water was removed and at the end of this period diluent was distilled off to give a final dispersion of 75% solids by weight. The polymer dispersion was of particle size 0.4–2 micron and the particles were insoluble in, but very slightly swollen by, acetone. The acid value was 25 mg KOH/g and the polymer had a Tg of 18° C.

B. Preparation of Pigment Millbase

To a 1-gallon ballmill, along with the requisite amount of ⅜" steatite balls, was charged:

| | |
|---|---|
| Dispersion (as described in A above) | 928 parts |
| Titanium dioxide RCR 6 (ex Tioxide International) | 760 parts |
| Soya bean oil fatty acid-hexa-ester of tripentaerythritol (viscosity 3 poise) | 140 parts |

The mill contents were ground for 24 hours, and the grinding medium then separated. The product was an 87.5% solids dispersion, the solids present consisting of 47.5% titanium dioxide, 43.5% polymer microparticles and 9% of the hexa-ester.

C. Preparation of Paints

Paints were made up by stirring together the following ingredients:

| Paint | P | Q | R | S |
|---|---|---|---|---|
| Pigment millbase (as described in B above) | 188 | 188 | 188 | 188 |
| Linseed oil fatty acid octa-ester of tripentaerythritol (viscosity 2.2 poise) | 30 | 30 | 30 | 30 |
| 1:6-Hexane diol dimethacrylate (viscosity 0.37 poise) | 10 | 10 | 10 | 10 |
| (Miture of cobalt octoate ((10% Co) 3.4%, lead octoate ((36% Pb) 28.4%, and calcium octoate (5% Ca) 68.2% | 13 | — | — | — |
| Cobalt octoate (10% Co) | — | 0.5 | — | — |
| (Mixture of cobalt octoate ((10 Co) 5.2%, Calcium | | | | |

-continued

| Paint | P | Q | R | S |
|---|---|---|---|---|
| (octoate (5% Ca) 51.96%, and (zirconium octoate (12% Zr) 42.9% | — | — | 8.5 | — |
| (Mixture of cobalt octoate (10% Co) (4.5%, calcium octoate (5% Ca) (45.4%, and aluminum aceto-(acetate complex* (9% Al) 50.1% | — | — | — | 9.8 |

*as described in British Patent No. 907,558

The paints were applied to glass panels and allowed to dry at room temperature (20° C.). The following results were achieved in tests made on a Beck-Koller drying time recorder. In this test, a weighted, ball-ended needle is periodically drawn through the film as it dries on the glass panel; the progression of the drying process can be observed by the extent to which the film is marked or torn.

| Paint | P | Q | R | S |
|---|---|---|---|---|
| Touch dry time (hrs) | 1½ | 7 | 4 | 2 |
| Mark free time (hrs) | 9 | 8 | 6 | 10 |

The composition of Paint P was as follows:

| | Constituent | % by weight | % by volume |
|---|---|---|---|
| Disperse Phase | Polymer microparticles | 30 | 37 |
| | Pigment | 33 | 11 |
| Continuous Phase | Autoxidisable liquid | 19 | 23 |
| | Co-reactive liquid | 4 | 6 |
| | Driers | 2 | 2 |
| Inert diluent | | 12 | 21 |

The viscosity of the continuous phase, excluding driers, was 2.1 poise; that of the continuous phase plus driers and diluent, 0.4 poise.

EXAMPLE 3

A. Preparation of Polymer Microparticles (a) Preparation of Amphipathic Copolymer Dispersant (i) A mixture of technical 12-hydroxy-stearic acid (1500 parts), tall oily fatty acids (117 parts), toluene (230 parts) and methane sulphonic acid (3 parts) was heated under reflux at around 160° C. for 8 hours, during which time 68 parts of water of condensation were removed. The final product had an acid value of 45 mg KOH/g and was a 86.9% solids solution. The polymeric product, being derived from technical 12-hydroxystearic acid containing 9.5% stearic acid, had a final composition stearic acid/tall oil fatty acid/12-hydroxystearic acid 0.5/0.42/4.53 molar, and hence approximately half of the polymer chains produced were terminated by an ester of tall oil fatty acid. The molecular weight of the polymer determined by acid value was $\overline{M}n = 1250$, and determined by gel permeation chromotograph (polystyrene calibration) was $\overline{M} = 1650$, $\overline{M}_w = 3700$.

(ii) A copolymer was prepared by the procedure described in Example 1 of methyl methacrylate/glycidyl methacrylate 83/17 by weight. The product was a 40% solids solution of the copolymer and by G.P.C. the copolymer was found to have $\overline{M}n = 8400$, $\overline{M}w = 17,000$.

(iii) The amphipathic copolymer dispersant was prepared following the procedure of Example 1 by reacting 333 parts of the polymer solution from (ii) above with 230 parts of the polymer solution from (i) above, along with 370 parts of 2-ethoxyethyl acetate and 0.5 parts of dimethyllaurylamine. The batch was raised to reflux temperature and distillate was removed to bring the reflux temperature up to 180° C. After refluxing over a period of 2 days, the acid value had dropped to below 0.5 mg KOH/g. Aliphatic hydrocarbon (boiling range 180°–210° C.) was then added and diluent was removed by distillation to give a final dispersant copolymer solution of 32% solids in the hydrocarbon. The graft copolymer thus obtained had an acrylic polymer backbone containing about 2% of pendant glycidyl groups, and pendant side-chains of poly(12-hydroxystearic) acid about half of which were terminated with tall oil fatty acid and half with stearic acid.

(b) Preparation of Dispersion

A 4-liter reaction vessel, fitted as described in Example 1 and in addition carrying an emulsifying head running submerged in the reactants, was used. To this vessel was charged:

| | |
|---|---|
| Aliphatic Hydrocarbon (boiling range 180°–210° C.) | 858 parts |
| Phthalic Anhydride | 440 parts |
| Dispersant solution (as obtained in (a) above) | 378 parts |
| Titanium/tin-ethylene glycol complex | 0.5 part |

This charge was raised to reflux temperature and to it was added the following feed mixture, half of the mixture being added over 10 minutes and the remaining half over a further 2 hours:

| | |
|---|---|
| Polyethylene glycol mol. wt. 200 | 139 parts |
| Diethylene glycol | 169 parts |
| Trimethylol propane | 80 parts |

(The above feed was mixed and warmed to dissolve the trimethylol propane before use).

The batch was held at reflux temperature over a total period of 12 hours, during which time 55 g of water was removed. The product, following the removal of some diluent by distillation, had a solids content of 57% and consisted of particles of size 1–5 microns. The molar formula of the polymer was phthalic anhydride/polyethylene glycol 200/diethylene glycol/trimethylol propane 1:0.23:0.54:0.2. The final acid value was 23 mg KOH/g N.V. and the particles were insoluble in, but swollen by, acetone. They had a glass-rubber transition temperature of about 17° C.

B. Preparation of Pigment Millbase

The following charge was ground in a 2-gallon ball-mill along with the requisite quantity of porcelain balls:

| | |
|---|---|
| 68% soya bean oil/pentaerythritol alkyd resin (75% solution) (viscosity) at 100% solids, 450 poise) | 729 parts |
| Titanium dioxide RCR-6 (ex Tioxide International) | 3256 parts |
| Zinc oxide | 62 parts |
| Aliphatic hydrocarbon (boiling range 140°–170° C.) | 453 parts |

After grinding for 24 hours, the charge was separated from the grinding medium. The composition of the involatile material in the product was TiO₂/ZnO/alkyd resin 84.2/1.6/14.2 and the concentration of involatile material 86% by weight.

C. Preparation of Paint

A paint was made as follows:
The following ingredients were mixed and charged to a rotary evaporator:

| | |
|---|---|
| Millbase (as obtained in B above) | 100 parts |
| Polymer microparticle dispersion (as obtained in A above) | 130 parts |
| Linseed oil fatty acid-hexa-ester of dipentaerythritol (viscosity 1.2 poise) | 26 parts |

All volatile material was removed from this mixture on the rotary evaporator with the aid of heat and reduced pressure. Following this, 6 parts of the drier mixture described in Example 1 was added, followed by sufficient aliphatic hydrocarbon to give a final viscosity for the paint of 3 poise, when measured on a high-shear cone and plate viscometer. The final solids content of the paint was 90.1%.

The paint composition was as follows:

| | | % by weight | % by volume |
|---|---|---|---|
| Disperse Phase | Polymer microparticles | 35 | 45 |
| | Pigments | 34 | 11 |
| | Alkyd resin | 6 | 8 |
| Continuous Phase | Autoxidisable liquid (other than alkyd) | 13 | 16 |
| | Driers | 2 | 2 |
| Inert Diluent | | 10 | 18 |

The viscosity of the continuous phase, excluding driers, was 4.2 poise; that of the continuous phase plus driers and diluent, 0.2 poise.

EXAMPLE 4

A. Preparation of Polymer Microparticles

A dispersion of crosslinked polyethylacrylate was made as follows:

The charge I was heated to reflux, and feed I was added over a period of 6 hours, the charge II being added to the last one-sixth of feed I. Following this, the batch was held under reflux for 2 hours and feed II was then added over 20 minutes. Finally, the batch was held at reflux temperature for a further 4 hours.

| Charge I | Aliphatic hydrocarbon (boiling range 100°–120° C. | 41 | parts |
|---|---|---|---|
| | Methyl methacrylate | 2 | parts |
| | Methacrylic acid | 0.05 | parts |
| | Azobis (isobutyronitrile) | 0.15 | parts |
| | Dispersant solution (as described below) | 6.6 | parts |
| Feed I | Ethyl acrylate | 42 | parts |
| | Glycidyl methacrylate | 0.9 | part |
| | Methacrylic acid | 0.9 | part |
| | Azobis (isobutyronitrile) | 0.5 | part |
| | Dispersant solution (as described below) | 3.8 | parts |
| Charge II | DABCO (triethylene diamine) | 0.55 | part |
| Feed II | Methyl methacrylate | 2.3 | parts |

| | | |
|---|---|---|
| Azobis (isobutyronitrile) | 0.1 | part |

Final solids content of the dispersion was 52%, and the particle size was 0.2 micron. The particles had a glass-rubber transition temperature of about −7° C.

The dispersant used in this procedure was a 33% solids solution in the above hydrocarbon of a copolymer obtained by reacting poly(12-hydroxystearic acid) with glycidyl methacrylate and then copolymerising the product at a ratio of 1:2 by weight with methyl methacrylate and methacrylic acid in the proportions 95/5.

B. Pigment Millbase

The pigment millbase described in Example 3B was used.

C. Paint Preparation

A paint was made in the same way as described in Example 3C, except that 144 parts of the polymer dispersion A above were used in place of the dispersion described in Example 3A. The paint so made had a non-volatile content of 84.5% after it had been adjusted to a viscosity of 3 poise as measured on the cone and plate viscometer. The overall paint composition was:

| | | % by weight | % by volume |
|---|---|---|---|
| Disperse Phase | Polymer Microparticles | 33 | 41 |
| | Pigments | 32 | 10 |
| | Alkyd resin | 6 | 7 |
| Continuous Phase | Autoxidisable liquid (other than alkyd) | 12 | 15 |
| | Driers | 2 | 2 |
| Inert Diluent | | 15 | 25 |

The viscosity of the continuous phase, excluding driers, was 4.5 poise; that of the continuous phase plus driers and diluent, 0.3 poise.

When applied by brush, the paint dried within 10 hours and gave a tough and elastic film.

EXAMPLE 5

A. Preparation of Polymer Microparticles

To a reaction vessel equipped with a mechanical stirrer, a mechanical emulsifier head, a steam-heated fractionating column carrying a Dean and Stark separator and a thermometer was charged the following:

| | | |
|---|---|---|
| Phthalic anhydride | 500 | g |
| Maleinised polybutadiene (see below) | 149 | g |
| Ethylene glycol titanate | 0.6 | g |
| Aliphatic hydrocarbon (boiling range 190°–210° C.) | 950 | g |

The charge was heated with stirring and, when the temperature had reached about 140° C., the emulsifier head was started. At a temperature of 160° C., when the charge had the appearance of a brown solution or coarse emulsion, the following feed was added over a period of about 5 minutes:

| | | |
|---|---|---|
| Polyethylene glycol mol. wt. 200 | 419 | g |
| Ethylene glycol | 42.5 | g |

-continued

| | | |
|---|---|---|
| Trimethylolpropane | 68 | g |

At the end of the addition, the batch reached the reflux temperature of 185° C. and over the next 5-10 minutes was seen to become white as the production of a fine emulsion took place. After 3 hours' heating at reflux temperature, when 36 ml of distillate had been removed, the steam supply to the fractionating column was turned off; heating was then continued. After a total of 7 hours' heating, examination of the batch under the optical microscope showed it to be a dispersion of particles of size 3–10 microns. After further heating up to a total of 14 hours, when a total amount of distillate of 74 mls had been removed (theoretical amount 75 ml), the resulting dispersion of polyester had a particle size range of 1–10 microns. The particles were swollen by, but were not soluble in, acetone; a determination of the acid value of the polyester carried out in the presence of acetone gave a result of 35 mg KOH/g. The molar ratios of the constituents were: phthalic anhydride/polyethylene glycol/ethylene glycol/trimethylolpropane 1/0.62/0.20/0.15. The particles had a glass-rubber transition temperature of about 6° C.

The maleinised polybutadiene used in the above procedure was made by reacting polybutadiene, having a molecular weight of 1500–2000 and comprising 45% of 1:2 structure, with maleic anhydride in the weight proportions of 93:7. This produced the equivalent of 1.15 maleic anhydride residues for each polybutadiene molecule of weight 1500.

At the end of the polymerization as just described, diluent was removed from the product by distillation, the final solids content of the preparation being 73.5%.

B. Pigment Dispersion

The following were charged to a 1-gallon ballmill along with the requisite amount of porcelain balls:

| | |
|---|---|
| Dispersion (as described in A International) | 960 parts |
| Titanium dioxide RCR 6 (ex Tioxide International | 760 parts |
| Soya bean oil fatty acid-hexa-ester of tripentaerythritol (viscosity 3 poise) | 140 parts |

The mill contents were ground for 24 hours. The product obtained contained 86.5% of involatile material, the solid present having the composition TiO$_2$ 47.5%, polymer microparticle dispersion 43.5%, hexa-ester 9%.

C. Paint Preparation

A paint was made by mixing the following ingredients with stirring:

| | |
|---|---|
| Pigment Millbse (as described in B above) | 200 parts |
| Soya bean oil fatty acid octa-ester of tripentaerythritol (viscosity 3 poise) | 30 parts |
| 1:6-hexane diol dimethacrylate (viscosity 0.37 poise) | 10 parts |
| Drier mixture as described in Example 1 | 12 parts |

The paint, after adjustment of viscosity to 3.5 poise (cone and plate) had a solids content of 89%; when applied by brush and allowed to dry at normal temperature, it was hard dry after 8 hours.

EXAMPLE 6

A. Preparation of Polymer Microparticles

A dispersion of particles was made in the manner described in Example 1, using the same dispersant as described therein, but with the particles having the molar composition tetraethylene glycol/diethylene glycol/trimethylol propane/phthalate 0.175/0.35/0.30. The resulting polyester dispersion had a solids content of 49.8%, a particle size range of 0.6–4 microns and an acid value of 18 mg KOH/g. The polymer was found to have a glass-rubber transition temperature of about 21° C. The polymer was insoluble in, but swollen by, acetone.

B. Preparation of Millbase

A millbase was prepared by charging the following to a 2-gallon laboratory ball mill together with the requisite quantity of porcelain beads:

| | |
|---|---|
| Titanium dioxide (Runa RM 472) | 2000 parts |
| Linseed oil fatty acid-tetraester of dipentaerythritol (viscosity 2 poise) | 300 parts |
| Aliphatic hydrocarbon (boiling range 100°–120° C.) | 570 parts |

After 24 hours' grinding the millbase was separated from the grinding medium, giving an 80% solids dispersion consisting of TiO$_2$ 69.5%, the tetra-ester 10.5% and hydrocarbon 20%.

C. Preparation of Paints

The following components were charged to a rotary evaporator as described in Example 5 and all volatile material was removed:

| | | |
|---|---|---|
| Millbase (as described in B) | 168.5 | parts |
| Polymer microparticle dispersion (as described in A) | 238 | parts |
| Linseed oil fatty acid-octa-ester of tripentaerythritol (viscosity 2.2 poise) | 45 | parts |

Paints were then made up as follows:

| | Paint J | Paint K | Paint L | Paint M |
|---|---|---|---|---|
| Mixture from evaporator | 100 | 100 | 100 | 100 |
| Drier blend as described in Example 5 | 1.7 | 1.7 | 1.7 | 1.7 |
| Lauryl methacrylate (viscosity 0.06 poise) | 1.8 | — | — | — |
| Ethylene glycol dimethacrylate (viscosity 0.04 poise) | — | 1.8 | — | — |
| Hexane diol dimethacrylate (viscosity 0.37 poise) | — | — | 1.8 | — |
| Hexyl methacrylate (viscosity 0.015 poise) | — | — | — | 1.8 |

Each paint was adjusted to a viscosity of 3 poise (cone and plate viscometer) by the addition of aliphatic hydrocarbon (boiling range 150°–170° C.) and each was found to be of about 92% solids content.

The composition of each paint was thus:

|  |  | % by Weight | % by Volume |
|---|---|---|---|
| Disperse Phase | Polymer microparticles | 35 | 46 |
|  | Pigment | 35 | 12 |
| Continuous Phase | Autoxidisable liquid | 19 | 24 |
|  | Co-reactive liquid | 2 | 3 |
|  | Driers | 1 | 1 |
| Inert Diluent |  | 8 | 14 |

The viscosities of the continuous phases, excluding driers, in Paints J, K, L and M were 2.7, 2.0, 3.0 and 2.2 poise respectively; the viscosity of the continuous phase plus driers and diluent was 0.2 poise in each case.

On testing by the Beck-Koller drying time recorder, the following results were obtained:

|  | Paint J | Paint K | Paint L | Paint M |
|---|---|---|---|---|
| Touch dry time (hours) | 1 | 1 | 1¼ | 1¼ |
| Mark free time (hours) | 3 | 4½ | 5 | 4 |

EXAMPLE 7

A. Polymer Microparticle Dispersion and Millbase Preparation

The same polymer microparticle dispersion and millbase were used as those described in Example 6.

B. Preparation of Autoxidisable Liquid

The following were charged to a reactor:

| Decanol | 158 parts |
|---|---|
| BF₃ etherate | 1.6 parts |

This mixture was heated to 60° C. and 434 parts of allyl glycidyl ether was added dropwise over a period of about 60 minutes, keeping the temperature down to 60° C. with cooling. The condensation product of decanol and allyl glycidyl ether so obtained had an average molar composition of 1:3.8 decanol/AGE; it had a viscosity of 1.5 poise.

C. Paint Preparation

The following intredients were charged to a rotary evaporator, and volatile material was removed as described in previous Examples:

| Millbase (as described in Example 6 B) | 100 parts |
|---|---|
| Polymer microparticle dispersion (as described in Example 6 A) | 135 parts |
| Autoxidisable liquid (as described in B above) | 27 parts |
| Following this, there was added with stirring: |  |
| Hexane diol dimethacrylate (viscosity 0.37 poise) | 5 parts |
| Mixed driers (as described in Example 1 | 4 parts |

The product was adjusted in viscosity to 3 poise by the addition of hydrocarbon diluent and was then found to have an involatile content of 93.5%.

The paint was shown by the Beck-Koller drying test to be touch-dry in 1½ hours and through-dry in 14 hours. After this time the paint film was found to be very hard and tough, and to have excellent colour.

The composition of the paint as applied was as follows:

|  |  | % by Weight | % by Volume |
|---|---|---|---|
| Disperse Phase | Pigment | 35 | 12 |
|  | Polymer microparticles | 35 | 46 |
| Continuous Phase | Autoxidisable liquids Linseed oil fatty acid tetraester | 5 | 7 |
|  | Decanol/AGE adduct | 14 | 18 |
|  | Co-reactive liquid | 3 | 4 |
|  | Drier | 1 | 1 |
| Inert Diluent |  | 7 | 12 |

The viscosity of the continuous phase, excluding driers, was 1.5 poise; that of the continuous phase plus driers and diluent, 0.15 poise.

EXAMPLE 8

A. Preparation of Polymer Microparticles

A dispersion of crosslinked polymethyl methacrylate particles was made as follows. In a reactor, fitted with stirrer, up-and-over condenser, inert gas feed and thermometer, is heated:

| Aliphatic hydrocarbon (boiling range 170°–210° C.) | 23.1 parts |
|---|---|
| Heptane | 24.5 parts |
| Hexane | 5.66 parts |

At reflux temperature (100° C.) is added to this charge:

| Methyl methacrylate | 1.86 part |
|---|---|
| Methacrylic acid | 0.04 part |
| Dispersant solution (as described in Example 4A) | 0.69 part |
| Azobis(isobutyronitrile) | 0.15 part | and the mixture is held for 30 minutes at that temperature for seed formation to take place.

To this mixture is then added (at reflux) at a steady rate over 3 hours, the following:

| Methyl methacrylate | 35.31 parts |
|---|---|
| Methacrylic acid | 0.36 part |
| Glycidyl methacrylate | 0.36 part |
| Azobis(isobutyronitrile) | 0.47 part |
| Dispersant solution (as described in Example 4A) | 7.43 parts |
| Dimethyl ethanolamine | 0.07 part |

The batch is then held at reflux temperature for a further 3 hours. An additional 20 parts of aliphatic hydrocarbon (boiling range 170°–210° C.) is added, and distillation is carried out to remove hexane and heptane, leaving a 50% dispersion of crosslinked polymethyl methacrylate having a particle size of 0.2 microns and a glass-rubber transition temperature of 106° C.

B. Preparation of Paint

A paint was made as follows:

The following ingredients were mixed and charged to a rotary evaporator:

| | |
|---|---|
| Millbase (as described in Example 3B) | 100 parts |
| Polymer microparticle dispersion (as obtained in A above) | 148 parts |
| Soya bean oil fatty acid-octa-ester of tripentaerythritol (viscosity 3 poise) | 26 parts |

Volatile material was removed from this mixture on the evaporator, and following this 6 parts of the drier mixture described in Example 1 was added, followed by sufficient aliphatic hydrocarbon to give a final viscosity for the paint of 3.5 poise. The final solids content of the paint was 84% by weight.

The paint composition was as follows:

| | | % by Weight | % by Volume |
|---|---|---|---|
| Disperse Phase | Polymer Microparticles | 33 | 41 |
| | Pigments | 31 | 10 |
| Continuous Phase | Alkyd Resin | 6 | 7 |
| | Other Autoxidisable liquid | 12 | 15 |
| | Driers | 2 | 2 |
| Inert Diluent | | 16 | 25 |

The viscosity of the continuous phase, excluding driers, was 6 poise; that of the continuous phase plus driers and diluent, 0.45 poise.

When applied by brush, the paint dried within 10 hours to give a tough, elastic film.

EXAMPLE 9

A. Preparation of Polymer Microparticles

A 4-liter reaction vessel fitted with a turbine stirrer, steam-jacketed condenser, Dean and Stark separator and thermometer, was charged with:

| | |
|---|---|
| Aliphatic hydrocarbon (boiling range 190°-210° C.) | 860 parts |
| Phthalic anhydride | 330 parts |
| Maleic anhydride | 74 parts |
| Titanium ethylene glycol complex | 0.5 part |
| Graft copolymer dispersant solution (see below) | 302 parts |

This charge was raised to reflux temperature and to it was added the following feed mixture, half of the mixture being added over 10 minutes and the remainder over a further 2 hours:

| | |
|---|---|
| Polyethylene glycol mol. wt. 200 | 140 parts |
| Diethylene glycol | 169 parts |
| Trimethylolpropane | 80 parts |

(The above feed was warmed to dissolve the trimethylolpropane before use).

The batch was held at reflux temperature over a period of 10 hours, during which time 56 g of water was removed. The product, following the removal of a portion of the diluent by distillation, had a solids content of 62% and consisted of particles of size 2–6 microns. The molar proportions of the constituents of the polymer were: phthalic anhydride/maleic anhydride/polyethylene glycol 200/diethylene glycol/trimethylolpropane=0.75/0.25/0.23/0.54/0.2. The final acid value was 21 mg KOH/g and the particles were insoluble in, but swollen by, acetone.

The graft copolymer dispersant used in this Example was obtained by reacting poly(12-hydroxystearic acid) with glycidyl methacrylate and copolymerising the product at a ratio of 2:1 by weight with a 90/10 mixture of methyl methacrylate and methacrylic acid. The product was used as a 40% solution in the above-described aliphatic hydrocarbon.

B. Preparation of Paint

A paint was made as follows: The following ingredients were mixed and charged to a rotary evaporator:

| | |
|---|---|
| Millbase (as described in Example 3B) | 100 parts |
| Polymer microparticle dispersion (as in A above) | 119 parts |
| Decanol/AGE reaction product (as described in Example 7B) | 26 parts |

Volatile material was removed from this mixture on the evaporator with the aid of heat. 6 parts of the drier mixture described in Example 1 was added, along with sufficient aliphatic hydrocarbon to give a viscosity of 4 poise. The final solids content of the paint was 89%. When applied, the paint dried within 10 hours and gave a tough, elastic film.

The paint composition was as follows:

| | | % by Weight | % by Volume |
|---|---|---|---|
| Disperse Phase | Polymer Microparticles | 35 | 43 |
| | Pigments | 33 | 11 |
| Continuous Phase | Alkyd Resin | 6 | 8 |
| | Other autoxidisable liquid | 13 | 16 |
| | Driers | 2 | 2 |
| Inert Diluent | | 11 | 20 |

The viscosity of the continuous phase, excluding driers, was 4.5 poise; that of the continuous phase plus driers and diluent, 0.35 poise.

EXAMPLE 10

A. Preparation of Polymer Microparticles

An apparatus described in Example 1A(b) was charged with:

| | |
|---|---|
| Aliphatic hydrocarbon (boiling range 190°-210° C.) | 700 parts |
| Phthalic anhydride | 1000 parts |
| Titanium ethylene glycol complex | 1.1 part |
| Graft copolymer dispersant solution (as used in Example 9) | 362 parts |

The charge was heated to 145° C. with rapid stirring and 226 parts of allyl glycidyl ether were then added.

The charge was raised to reflux temperature and half of the following feed mixture was added over a period of 15 minutes. The feed was warmed before use in order to dissolve the trimethylol propane:

| | |
|---|---|
| 1:6 hexane diol | 240 parts |
| Trimethylol propane | 272 parts |

The remaining feed was added over 2 hours and the batch was then refluxed for a further 6 hours. During this period, 85 g of water was removed and at the end of the period diluent was distilled off to give a final dispersion solids content of 73%. The polymer obtained was of the composition 1:6-hexane diol/allyl glycidyl ether/trimethylol propane/phthalic anhydride=0.3/0.3/0.3/1. The particle size was 0.5–3 microns, the glass-rubber transition temperature 8° C. and the acid value 22 mg KOH/g.

B. Coating Preparation

An unpigmented coating formulation was prepared by mixing the following ingredients:

| | |
|---|---|
| Polymer dispersion (from A above) | 60 parts |
| Tall oil alkyd solution (see below) | 29 parts |
| 1:6-Hexane dimethacrylate | 5 parts |
| Drier mixture (as described in Example 1) | 6 parts |

The tall oil alkyd was prepared by condensing tall oil fatty acids, pentaerythritol and phthalic anhydride in the molar ratios 1.93/1.11/1.00, to an acid value of 21 mg KOH/g. The molecular weight of the alkyd as measured by G.P.C. was: $\overline{M}_n=2030$, $\overline{M}_2=4200$; the viscosity of the alkyd (100% solids) was 45 poise. The alkyd was used at 94% solids solution.

The "clear" coating so obtained was found to be of 2.5 poise viscosity and of 79% solids. When applied, it was found to dry to an elastic finish in 8 hours, and though being of milky appearance when applied it was substantially clear when dry.

The composition as applied was as follows:

| | | % by Weight | % by Volume |
|---|---|---|---|
| Disperse Phase | (Polymer Microparticles | 44 | 37 |
| Continuous Phase | Alkyd | 27 | 29 |
| | Coreactive liquid | 5 | 5 |
| | Driers | 3 | 2 |
| Inert Diluent | | 21 | 27 |

The viscosity of the continuous phase, excluding driers, was 11 poise; that of the continuous phase plus driers and diluent, 0.35 poise.

We claim:

1. A coating composition in which the film-forming material consists of:
   (a) from 30% to 85% by volume of a disperse phase consisting of particles having a size or size distribution in the range 0.01 to 20 microns, not less than 50% by volume of those particles consisting of cross-linked polymer microparticles, and the disperse phase being maintained by means of an amphipathic dispersing agent in a substantially deflocculated, sterically stabilized state of dispersion in
   (b) from 70% to 15% by volume of a liquid continuous phase having a viscosity of from 0.1 to 20 poise at room temperature which is capable of curing to a film-forming polymer, the total volume of (a) and (b) being 100% and either the disperse phase or the continuous phase, or both, containing autoxidisable groupings which are capable of initiating the curing of the continuous phase.

2. A composition as claimed in claim 1, wherein the amphipathic dispersing agent whereby the polymer microparticles are brought into a state of stable dispersion in the liquid continuous phase is a graft copolymer comprising as one type of polymeric component a polymer backbone which is not solvated by the continuous phase liquid and is capable of becoming anchored to the polymer microparticles, and as another type of polymeric component a plurality of polymer chains pendant from the backbone which are solvatable by the continuous phase liquid.

3. A composition as claimed in claim 1, wherein the amphipathic dispersing agent contains in the molecule autoxidisable groupings which can initiate the curing of the liquid continuous phase.

4. A composition as claimed in claim 2, wherein the polymer backbone of the graft copolymer dispersing agent contains groupings which are capable of becoming chemically linked to the polymer of which the microparticles consist.

5. A composition as claimed in claim 1, wherein the stable dispersion of the cross-linked polymer microparticles is obtained by dispersion polymerisation of suitable monomers, in the presence of the amphipathic dispersing agent, in a volatile, inert organic liquid in which the microparticles are insoluble.

6. A composition as claimed in claim 1, wherein the liquid continuous phase possesses autoxidisable groupings.

7. A composition as claimed in claim 6, wherein the liquid continuous phase comprises a drying oil, an oil-modified alkyd resin or an ester of a polyhydric alcohol with an autoxidisable fatty acid.

8. A composition as claimed in claim 1, wherein the liquid continuous phase possesses groupings which are capable of taking part in, but not of initiating, the autoxidative curing of that phase.

9. A composition as claimed in claim 1, wherein autoxidisable groupings constitute at least 1% of the total number of autoxidisable and coreactive groupings present.

10. A composition as claimed in claim 1, which contains in addition a metallic or non-metallic drier system whereby the autoxidative curing process is assisted.

11. A composition as set forth in claim 1 in which the disperse phase consists of particles having a size distribution in the range 0.2 to 10 microns.

* * * * *